United States Patent
Grieser et al.

(10) Patent No.: US 6,910,457 B2
(45) Date of Patent: Jun. 28, 2005

(54) METHOD AND SYSTEM FOR SWITCHING OFF AN INTERNAL COMBUSTION ENGINE

(75) Inventors: Klemens Grieser, Langenfeld (DE); Ulrich Kramer, Bergisch Gladbach (DE); Klaus Badke, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 10/693,304

(22) Filed: Oct. 24, 2003

(65) Prior Publication Data

US 2004/0123831 A1 Jul. 1, 2004

(30) Foreign Application Priority Data

Oct. 25, 2002 (EP) .............................................. 02102483

(51) Int. Cl.⁷ .............................................. F02D 45/00
(52) U.S. Cl. .......................... 123/198 DB; 123/198 DC
(58) Field of Search ................... 123/198 DB, 198 DC, 123/198 D, 336, 337

(56) References Cited

U.S. PATENT DOCUMENTS

| | | |
|---|---|---|
| 4,735,179 A | 4/1988 | Ejiri et al. |
| 6,098,585 A | 8/2000 | Brehob et al. |
| 6,453,863 B1 | 9/2002 | Pels et al. |
| 6,786,199 B2 * | 9/2004 | Oda et al. .................. 123/399 |

FOREIGN PATENT DOCUMENTS

| | | |
|---|---|---|
| DE | 19735455 | 11/1998 |
| DE | 19835045 C2 | 2/1999 |
| DE | 19848368 C2 | 4/2000 |
| DE | 19848368 A1 | 4/2000 |
| DE | 10055112 A1 | 5/2002 |
| EP | 1217195 A3 | 6/2002 |
| EP | 1217195 A2 | 6/2002 |
| JP | 58155238 | 9/1983 |
| WO | WO 01/48373 A1 | 7/2001 |

* cited by examiner

*Primary Examiner*—Mahmoud Gimie
*Assistant Examiner*—Hyder Ali
(74) *Attorney, Agent, or Firm*—Diana D. Brehob

(57) ABSTRACT

The invention relates to a method for switching off an internal combustion engine and to an internal combustion engine suitable for carrying out said method. Here, after a switching off command for an internal combustion engine, the throttle valve in the air intake system is again opened to enable a relatively large amount of fresh air to be sucked into the combustion chambers of the internal combustion engine. This considerably increases the gas forces in the combustion chambers while the engine slows to a standstill, so that the internal combustion engine can be switched off in a controlled manner. At the same time, products of combustion, which may possibly still be present, are removed from the combustion chambers of the internal combustion engine. As a result, the preconditions for directly starting the internal combustion engine without a starter are created.

9 Claims, 2 Drawing Sheets

METHOD AND SYSTEM FOR SWITCHING OFF AN INTERNAL COMBUSTION ENGINE

FIELD OF INVENTION

The invention relates to a method for switching off an internal combustion engine and to an internal combustion engine suitable for carrying out the method.

BACKGROUND OF INVENTION

Modern internal combustion engines cannot usually be started from rest without an auxiliary unit. In the cylinder or cylinders of internal combustion engines, in which the fuel is fed into the combustion air within the induction section, there is, as a rule, no ignitable air/fuel mixture, or only a little, so that activating the ignition source of a spark ignition unit is not sufficient to start combustion. Therefore, an auxiliary drive (usually electrically operated), referred to as a starter, is used, to bring the internal combustion engine to a starting speed. At this speed, sufficient ignitable mixture is sucked into the cylinders, ignited by means of a spark ignition device and the internal combustion engine is thus started. The starter can then be switched off and the internal combustion engine continues to rotate under its own power.

The situation is different in the case of internal combustion engines in which the fuel is introduced directly into at least one cylinder, the fuel usually being injected under pressure into the cylinder. If fuel is injected into one or more cylinders and subsequently ignited inside a stationary internal combustion engine, the resulting gas force can be sufficient to move the associated piston. The movement of the piston imparts angular momentum to the crankshaft via a connecting rod, and the angular momentum can be sufficient to induce the normal sequence of cycles of an internal combustion engine. In this way, the internal combustion engine can be started up or started directly without using a starter.

A plurality of preconditions have to be fulfilled to allow an internal combustion engine to start directly in the above-described manner. For instance, at least one piston of a cylinder of the internal combustion engine should be in a position, in which injecting fuel and subsequently igniting the created air/fuel mixture actually leads to a movement of the piston located in the cylinder. In the case of a four-stroke internal combustion engine, the piston would therefore have to be in the expansion or working cycle, and the at least one outlet gas exchange valve would have to be in a closed position. This is the case, for example, at a position of approximately 5° to 10° crank angle after top dead center (TDC). The piston would also move in the case of a position of approximately 5° to 10° before TDC. However, the crankshaft would then move counter to the desired direction of rotation. U.S. Pat. No. 6,098,585 describes, by way of example, a method for direct starting. Here, a suitable combustion chamber is identified, which is formed from a cylinder and piston, which is in the working cycle and contains a sufficient volume of air. A predetermined amount of fuel is subsequently injected and ignited. However, U.S. Pat. No. 6,098,585 assumes that a starter, even if of relatively small dimensions, is nevertheless required for starting the internal combustion engine.

A somewhat different approach is chosen in U.S. Pat. No. 6,453,863. Here, the crankshaft is moved into a preferred position by a starter motor which is mounted directly on the crankshaft and serves after starting as a generator, what is referred to as a starter generator. In said preferred position, it is possible to make it considerably easier, for example, to start the internal combustion engine using the above-described method of injecting fuel and subsequently igniting it.

In WO 01/48373, the desired piston position is achieved by the piston already being moved to the desired position when the internal combustion engine is switched off. As the internal combustion engine continues to move for a few revolutions after the ignition and the fuel supply have been switched off, on account of the engine's moment of inertia, until it has come to a standstill as a result of frictional and gas forces, it is possible for a suitable position for direct starting to be reached, for example, by switching the engine off in a controlled manner, by advancing the crankshaft by means of an auxiliary drive, or by executing additional individual working cycles during the switching off process.

The abovementioned methods have the disadvantage, however, that they only concentrate on reaching a favorable piston position to perform direct starting by means of auxiliary drives or to make the process of starting an internal combustion engine easier. In the process, they neglect the fact that relatively large amounts of products of combustion may still be located in the cylinder or cylinders, so that it is not possible to carry out direct starting, which may possibly take place later, the above-described method on account of a lack of oxygen in the cylinder or cylinders.

SUMMARY OF THE INVENTION

The method according to the invention for the controlled switching off of an internal combustion engine with spark ignition is distinguished by the fact that as high as possible a cylinder pressure can build up in the compression and working cycles while the internal combustion engine is slowing to a standstill. This can be achieved by opening the previously closed throttle valve at least once by a specified absolute rotational angle value after the spark ignition and fuel supply have been switched off. In comparison with the customary method for switching off an internal combustion engine with the throttle valve closed, considerably more fresh air is sucked into the cylinders during the switching off process in the method according to the invention. This means that the cylinder pressure is increased considerably during the remaining compression cycles while the internal combustion engine is slowing to a standstill, in comparison with the cylinder pressure of an internal combustion engine which slows to a standstill with the throttle valve closed. Customary values here are, for example, 5 bar cylinder pressure with the throttle valve closed, compared with, for example, 20 bar cylinder pressure with the throttle valve completely open. The increased cylinder pressure results in higher gas forces. In contrast, the frictional forces change only slightly. The ratio of gas forces to frictional forces therefore becomes greater. The gas forces are dependent on the crank angle. They reach their maximum at the respective top dead center (high pressure TDC). The force equilibrium of the gas forces of the expansion cylinder and the compression cylinder lies at approximately 90° crank angle after TDC (in relation to the expansion cylinder). This angular position is an advantageous switching off position, as it favors the subsequent re-starting operation. High gas forces, therefore, favor a switching off position which is suitable for direct starting. Moreover, it is also of advantage that, with the throttle valve open, products of combustion which may possibly still be present are removed from the combustion chambers of the internal combustion engine by the fresh air flowing into the internal combustion engine. This ensures that sufficient oxygen is available for combustion of the fuel in the case of a direct starting operation comprising the injection of fuel into a combustion chamber and ignition of the fuel/air mixture which is produced.

It is, however, also conceivable that in the case of an internal combustion engine without a throttle valve and with gas exchange valves which can be actuated individually and independently, the described method can be carried out by appropriate actuation of the gas exchange valves. Ultimately, the throttle valve or the actuation of the gas exchange valves functions here as a variable gas metering system which controls the supply of combustion air into the internal combustion engine.

If the throttle valve is open while the internal combustion engine is slowing to a standstill, this can result in comfort problems caused by the internal combustion engine shaking or bucking. In one preferred refinement of the invention, the throttle valve is opened for only a short time after the engine has been switched off, in order to flush the cylinders with fresh air. Afterward, the throttle valve is closed at least once while the engine is slowing to a standstill, so that the internal combustion engine slows to a standstill more gently. In good time, before the internal combustion engine comes to a complete standstill, the throttle valve is opened once more, to ensure that the engine comes to a controlled standstill. Simultaneously, the supply of fresh air into the combustion chambers is maximized.

According to one development of the invention, a rotational speed signal is used to actuate the throttle valve. While the internal combustion engine is slowing to a standstill, it is possible in this way to open or close the throttle valve, for example if a specific rotational speed is undershot. A method of the abovedescribed type can thus be realized using simple means.

In another development of the invention, the intake manifold vacuum is measured. The signal can be used to actuate the throttle valve. Thus, for example, a signal to close the throttle valve could result from a minimum vacuum pressure being reached, and a signal to open the throttle valve can result from a previously determined maximum vacuum pressure being reached shortly before the internal combustion engine reaches a standstill. As an appropriate pressure signal is frequently present in direct injection internal combustion engines, it is simple to implement this variant.

In one preferred embodiment of the invention, the rotational angle signal of the crankshaft or camshaft is used to actuate the throttle valve. If the respective rotational angle signal is subjected to integration, the number of camshaft or crankshaft rotations, for example, after the last ignition can be ascertained. In this way, for example, the opening or closing of the throttle valve can be actuated after a predetermined number of revolutions. The simple implementation of the method, without additional sensors, etc. being required, is also advantageous here.

As already stated, it is, furthermore, advantageous if the throttle valve is opened again shortly before the internal combustion engine comes to a standstill. Firstly, in order that the internal combustion engine comes to a standstill in a controlled manner, it is advantageous to open the throttle valve during the intake process of the cylinder which later, when the engine is stationary, becomes the last compression cylinder. Secondly, it is advantageous to open the throttle valve during the intake process of the cylinder which later, when the engine is stationary, becomes the last expansion cylinder to achieve a maximum supply of fresh air for this cylinder, thus to have sufficient fresh air available in this cylinder for subsequent direct starting.

The invention relates, furthermore, to an internal combustion engine suitable for carrying out at least one of the abovementioned methods. Here, the internal combustion engine comprises at least one combustion chamber from a cylinder head, a cylinder, and a piston, an air inlet section and a device for influencing the intake air stream. This can be, for example, a throttle valve. A separate independent controller for the inlet gas exchange valves is also suitable, however, for carrying out the above-mentioned methods.

BRIEF DESCRIPTION OF THE FIGURES

In the following text, the invention will be explained, by way of example, in greater detail using the figures, in which.

DETAILED DESCRIPTION

Figure 1:
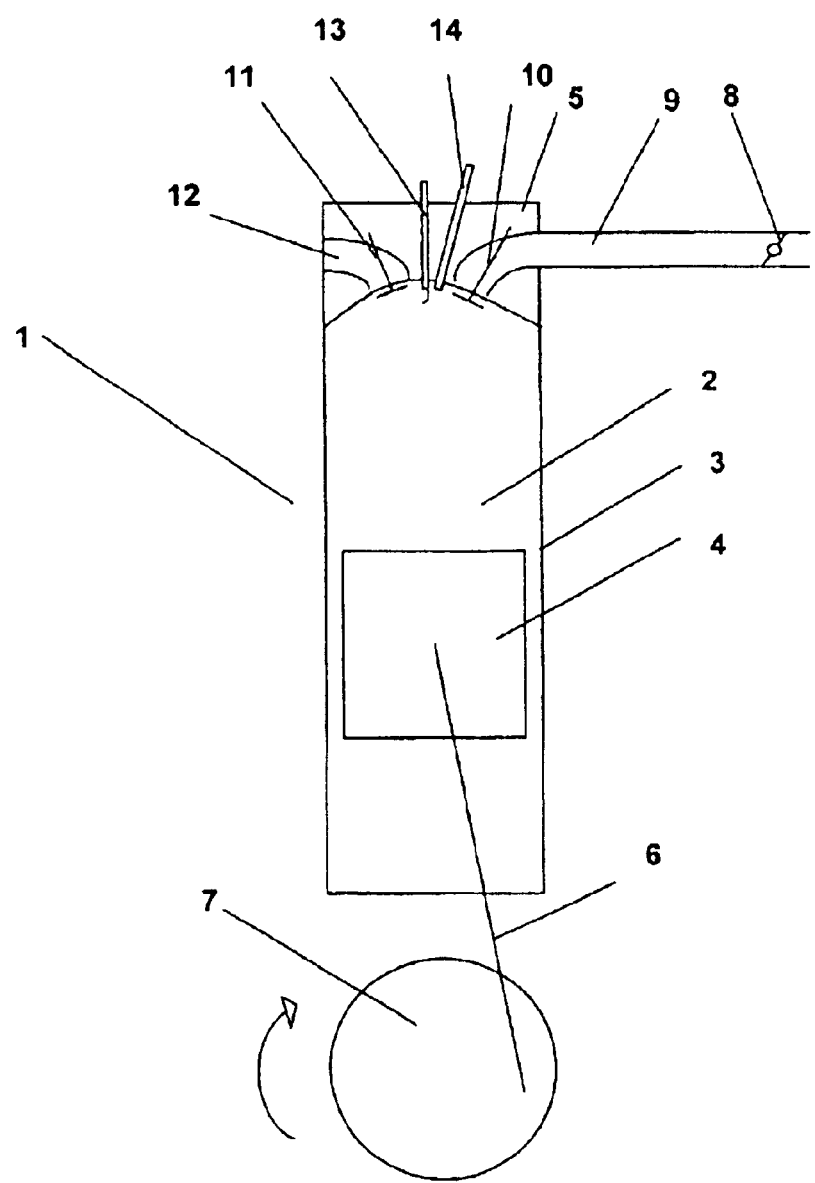
FIG. 1 shows a section through a cylinder of a schematically depicted internal combustion engine having a schematically depicted air intake system and throttle valve.

FIG. 1 schematically shows a side view of a section through an internal combustion engine 1. A combustion chamber 2 can be seen here formed by a cylinder 3, which is delimited by a piston 4 and a cylinder head 5. The combustion air passes via the throttle valve 8 and an air intake duct 9 into the combustion chamber 2 by way of a gas exchange inlet valve 10. In a known manner, fuel is injected into the combustion chamber 2 in the working cycle by means of an injection nozzle 14 and is subsequently ignited in a known manner by a spark ignition system by means of an ignition spark from a spark plug 13. The gas force, which is produced during this combustion of the air/fuel mixture created in combustion chamber 2, moves piston 5 downward in a known manner and converts the movement of piston 5 into a rotational movement of crankshaft 7 by means of a connecting rod 6 in a known manner. After combustion, the products of combustion exit internal combustion engine 1 via a gas exchange outlet valve 11 and an exhaust duct 12. The rotational direction of the crankshaft is shown by an arrow.

According to the invention, throttle valve 8 is then opened for some time, after internal combustion engine 1 has been switched off, i.e., after the injection of fuel by injection nozzle 14 into combustion chamber 2 has been terminated and/or the spark ignition unit has been switched off. This may be the case for the whole time internal combustion engine 1 is slowing to a standstill or only for a certain time or for a few revolutions of crankshaft 7. Moreover, it is also possible to vary the degree of opening of throttle valve 8. An opening angle of, for example, 15° may thus be sufficient. Considerably more fresh air is then sucked into combustion chamber 2 by piston 4 moving downward in cylinder 3 than would be the case if throttle valve 8 were closed. The resulting considerably increased cylinder pressure in combustion chamber 2 during the compression cycle allows internal combustion engine 1 to come to a standstill at a preferred crank angle position. Simultaneously, products of combustion which may possibly still be located in combustion chamber 2 are removed from combustion chamber 2 through gas exchange outlet valve 11 and exhaust duct 12 as a result of the increased supply of fresh air.

Figure 2:
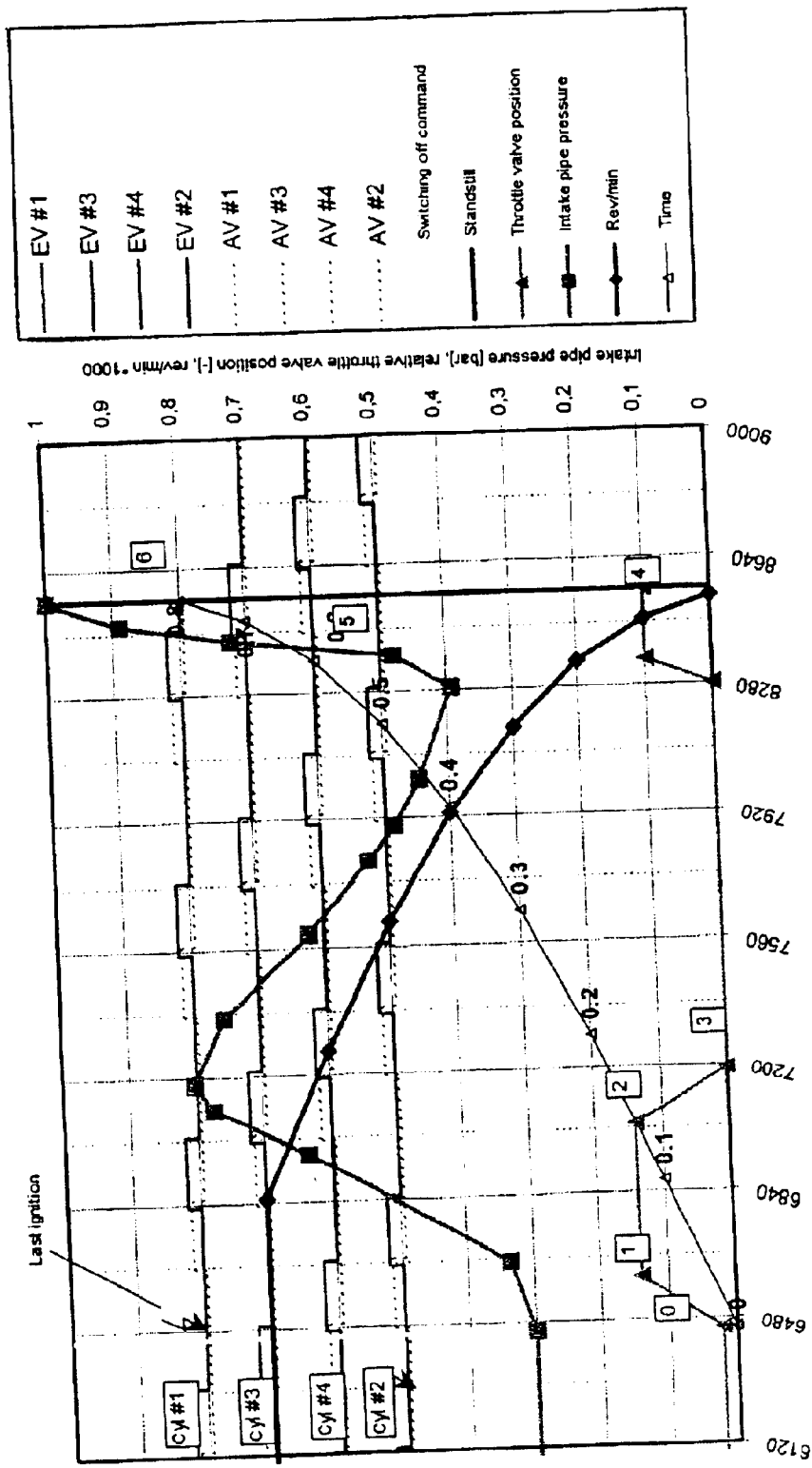
FIG. 2 shows a diagram of some of the functions of the internal combustion engine which are relevant to the switching off process, during the switching off process.

FIG. 2 shows, in the form of a diagram, the process of the four-cylinder internal combustion engine slowing to a standstill. The opening and closing of the gas exchange inlet valves are plotted against the crankshaft angle here, EV #1 for the inlet valve of the first cylinder through EV # 4 for the inlet valve of the fourth cylinder, the opening and closing of the gas exchange outlet valves, AV #1 for the outlet valve of the first cylinder through AV # 4 for the outlet valve of the fourth cylinder, as well as the intake pipe pressure or intake pipe air pressure, the throttle valve position, rotational speed of the internal combustion engine and the time taken for the internal combustion engine to come to a standstill after the switching off command.

After the switching off command, the throttle valve opens, according to the invention, as quickly as possible to a predetermined value, which can be, for example, 15° with respect to the closed position. Maximum opening or intermediate positions are, however, also conceivable. On account of the throttle valve being open here by 15°, fresh air then flows in increased quantities into the internal combustion engine, so that the absolute pressure in the intake pipe rises, from approximately 0.3 bar to 0.8 bar in this case. In this way, the combustion chambers are flushed with fresh air. The rotational speed of the internal combustion engine drops simultaneously and continuously on account of frictional forces and gas exchange work. To reduce the above-described noise and comfort problems while the engine is slowing to a standstill, the throttle valve then closes again after some time or after some crankshaft revolutions. In the example shown, the throttle valve is closed again after two revolutions. According to the invention, fresh air is once again sucked into the cylinders in good time before the internal combustion engine is stationary. As a result, the engine is brought to a standstill in a controlled manner to a desired crankshaft position. The suitable signal for identifying this cylinder can now be derived, as described above, from the rotational speed, the intake manifold pressure or the angular movement of the crankshaft after the switching off command, for example. In the example shown, therefore, the throttle valve is opened once more in a controlled manner after the fifth crankshaft revolution after the switching off command or after 1800° of crankshaft angle rotation. As a result of the gas inlet valve, which is open at this time, of the first cylinder (EV #1), the first cylinder therefore draws in fresh air until it is full, according to the invention, and as a result builds up an increased compression resistance, which brings the engine to a standstill at a desired crankshaft position.

We claim:

1. A method for the controlled switching off of a spark ignition internal combustion engine having at least one combustion chamber formed by a cylinder and a piston, and having an associated combustion air intake system having at least one of a throttle valve and a variable gas metering system, the engine being coupled to an engine controller, said method comprising:
   opening the throttle valve at least once during the switching off operation of the engine wherein said throttle valve actuation is based on a rotational speed signal.

2. The method as claimed in claim 1, further comprising:
   closing the throttle valve at least once during the switching off operation of the internal combustion engine.

3. The method of claim 1 wherein said rotational speed signal is based on at least one of a crankshaft rotational angle signal and a camshaft rotational angle signal.

4. The method of claim 1, further comprising:
   opening the throttle valve during the last intake process of the cylinder which later, when the engine is stationary, is the compression cylinder.

5. The method of claim 1, further comprising:
   opening the throttle valve during the last intake process of the cylinder which later, when the engine is stationary, is the expansion cylinder.

6. A method for the controlled switching off of a spark ignition internal combustion engine having at least one combustion chamber formed by a cylinder and a piston, and having an associated combustion air intake system having at least one of a throttle valve and a variable gas metering system, the engine being coupled to an engine controller, said method comprising:
   opening the throttle valve at least once during the switching off operation of the engine wherein said throttle valve actuation is based on an intake manifold pressure signal is used to actuate the throttle valve.

7. An engine system for the controlled switching off of a spark ignition internal combustion engine having at least one combustion chamber formed by a cylinder and a piston, said system comprising:
   an air intake system having a throttle valve; and
   an engine controller electronically coupled to the engine and said throttle valve, said controller causing said throttle valve to open at least once during the switching off operation of the engine wherein said controller bases said throttle valve opening on at least one of on a rotational speed signal and an intake manifold pressure signal.

8. The engine system of claim 7, wherein said controller causes said throttle valve to open during the last intake process of a particular cylinder, said particular cylinder being on a compression stroke when the engine comes to a standstill.

9. The engine system of claim 7, wherein said controller causes said throttle valve to open during the last intake process of a particular cylinder, said particular cylinder being on an expansion stroke when the engine comes to a standstill.

* * * * *